United States Patent
Previero

(10) Patent No.: US 10,792,841 B2
(45) Date of Patent: Oct. 6, 2020

(54) METHOD AND APPARATUS FOR WASHING SHEETS OF PLASTIC MATERIAL

(71) Applicant: PREVIERO N. S.R.L., Lissone (IT)

(72) Inventor: Flavio Previero, Lissone (IT)

(73) Assignee: Previero N. S.r.l. (IT)

( * ) Notice: Subject to any disclaimer, the term of this patent is extended or adjusted under 35 U.S.C. 154(b) by 0 days.

(21) Appl. No.: 16/307,033

(22) PCT Filed: Jun. 5, 2017

(86) PCT No.: PCT/EP2017/063620
§ 371 (c)(1),
(2) Date: Dec. 4, 2018

(87) PCT Pub. No.: WO2017/211767
PCT Pub. Date: Dec. 14, 2017

(65) Prior Publication Data
US 2019/0217505 A1    Jul. 18, 2019

(30) Foreign Application Priority Data

Jun. 6, 2016 (IT) ................. UA2016A004124

(51) Int. Cl.
| | |
|---|---|
| B29B 17/02 | (2006.01) |
| B08B 3/04 | (2006.01) |
| B03B 5/38 | (2006.01) |
| B03B 11/00 | (2006.01) |

(Continued)

(52) U.S. Cl.
CPC ............... *B29B 17/02* (2013.01); *B03B 5/02* (2013.01); *B03B 5/38* (2013.01); *B03B 5/40* (2013.01);

(Continued)

(58) Field of Classification Search
None
See application file for complete search history.

(56) References Cited

U.S. PATENT DOCUMENTS

| | | | |
|---|---|---|---|
| 4,073,661 | A | 2/1978 | Buzga et al. |
| 4,196,019 | A | 4/1980 | Kohler et al. |

(Continued)

FOREIGN PATENT DOCUMENTS

| | | |
|---|---|---|
| CN | 202826148 U | 3/2013 |
| CN | 203635540 U | 6/2014 |
| EP | 0094282 A2 | 11/1983 |
| EP | 0129518 A1 | 12/1984 |
| JP | S60127111 A | 7/1985 |
| KR | 100633111 B1 | 9/2006 |

*Primary Examiner* — Eric W Golightly
*Assistant Examiner* — Arlyn I Rivera-Cordero
(74) *Attorney, Agent, or Firm* — Laubscher & Laubscher, P.C.

(57) ABSTRACT

A method and apparatus for washing sheets of plastic material originating from industrial and agricultural waste, for subsequent reuse thereof as a raw material. The sheets of plastic material, precut into soiled pieces of large dimensions, and a water flow are supplied to a washing tank containing a water bath; a screw stirrer generates intense stirring of the water bath and recirculation, inside the tank, of the soiled plastic pieces that causes the contaminating material to be detached and separated by sedimentation from the plastic pieces. The cleaned pieces of plastic material of large dimensions, devoid of contaminant, which float in the water bath are removed by dragging, in a floating condition, along a discharging channel by the combined action of a dragging device and of a water flow that exits the washing tank; the dragging device, consisting of an endless belt, extends from one side of the washing tank along the discharging channel, supported in a freely tiltable manner.

12 Claims, 5 Drawing Sheets

(51) Int. Cl.
*B03B 5/02* (2006.01)
*B03B 5/40* (2006.01)
*B29B 17/00* (2006.01)
*B29K 105/06* (2006.01)
*B29L 7/00* (2006.01)

(52) U.S. Cl.
CPC .............. *B03B 11/00* (2013.01); *B08B 3/044* (2013.01); *B29B 17/00* (2013.01); *B03B 2011/006* (2013.01); *B29B 2017/0289* (2013.01); *B29K 2105/065* (2013.01); *B29L 2007/008* (2013.01); *Y02W 30/62* (2015.05); *Y02W 30/622* (2015.05)

(56) References Cited

U.S. PATENT DOCUMENTS

| | | | | |
|---|---|---|---|---|
| 4,619,409 A | * | 10/1986 | Harper | A61M 5/3278 241/186.2 |
| 4,750,995 A | * | 6/1988 | Fogerson | B03B 5/30 209/17 |
| 4,830,188 A | * | 5/1989 | Hannigan | B03B 5/40 209/17 |
| 4,950,390 A | * | 8/1990 | Szentlaszloi | B03D 1/1462 209/164 |
| 2012/0032009 A1 | | 2/2012 | Flores | |

\* cited by examiner

METHOD AND APPARATUS FOR WASHING SHEETS OF PLASTIC MATERIAL

CROSS REFERENCE TO RELATED APPLICATIONS

This application is a § 371 National Stage Entry of Application No. PCT/EP2017/063620 filed Jun. 5, 2017. PCT/EP2017/063620 claims priority of IT UA2016A004124 filed Jun. 6, 2016. The entire contents of these applications are incorporated herein by reference.

FIELD OF THE INVENTION

The present invention refers to recycling sheets of plastic material, for successive reuse as a raw material, and in particular it refers to a method and to an apparatus for washing plastic sheets or film which are pre-cut into pieces of large dimensions, originating from waste in the agricultural sector or from any industrial sector; the plastic sheets or film have to be suitably washed to eliminate contaminating substances, such as soil, sand, gravel and pieces of another material that has remained sticking to the sheets or film of plastic material or have been discarded during a work process.

Industrial waste and waste in the agricultural sector comprise large quantities of plastic film and sheets, mainly consisting of polyvinylchloride (PVC) and polyethylene (PE) as well as of other resins, the commercial value of which depends in large part on the degree of cleanness and on the percentage of contaminant substance that after washing remains sticking to the plastic film and sheets.

Conventionally, plastic sheets and film coming from agricultural and industrial waste have to be comminuted and cut into pieces of small dimensions, of the order of a few tenths of a centimetre or less, before being washed in a water bath to eliminate the contaminating substances.

Currently, washing plants and apparatuses are used that are extremely complex and have large dimensions, which require large consumption of water and precious energy resources.

Further, cutting beforehand plastic film and sheets with large quantities of contaminating material into small dimensions, as referred to previously, entails rapid wear to and/or breakage of the tools of the normal cutting mills, with consequent maintenance and intervention costs for the necessary repairs and/or replacements of broken or worn cutting tools.

BACKGROUND OF THE INVENTION

Plants and apparatuses for washing plastic film and sheets originating from agricultural and industrial waste are disclosed, for example, in U.S. Pat. No. 4,196,019, EP0094282, U.S. Pat. No. 4,073,661, EP0129518, CN202826148, JPS60127111, US2012/032009 and CN203635540U.

In particular, U.S. Pat. No. 4,196,019 illustrates an apparatus for washing plastics obtained from film and/or sheets cut beforehand into pieces of small dimensions, in which the apparatus comprises an elongated tank, suitable for being filled up to a preset level with a washing bath, provided with a blade stirrer that extends horizontally just below the upper level of the washing bath, to generate a stirring state; the blade stirrer pushes the plastic pieces of small dimensions, which float in the washing bath, downwards below the lower edge of a baffle that separates a stirring zone from a zone of the latter of the washing tank, to a horizontal channel from which the plastic pieces are discharged by a rotating drum; such a solution is completely unsuitable for washing plastic pieces of large dimensions.

EP 0 094 282 shows a plant for retrieving plastic film and sheets, comprising a plurality of serially connected washing tanks, in which plastic film and sheets have to be again comminuted and reduced beforehand into pieces of small dimensions, before being introduced into a series of washing tanks that are in communication with one another via labyrinth passages, in which the single washing tanks are provided with normal blade stirrers; the plastic pieces which float in the water bath are pushed along a discharging channel by a plurality of suitably spaced rotors along a discharging channel, and extracted from the bath by a blade wheel; also this solution is unsuitable for washing plastic film and sheets in pieces of large dimensions, inasmuch as they would tend to stick to the blades of the stirrers and to the rotors along the discharging channel.

U.S. Pat. No. 4,073,661 shows in turn a washing apparatus of the type mentioned, which is substantially similar to that of U.S. Pat. No. 4,196,019, in which the plastic material to be washed is again introduced in pieces of small dimensions into a water bath of a washing tank comprising a horizontal stirrer, a stirring zone of the washing tank is separated from a rest zone by a dividing baffle that extends into the water bath, in which the plastic pieces which float in the tank are removed by dragging by an endless conveyor, which is partially positioned above the washing bath and along a discharging channel oriented upwards, which extends from one side of the washing tank, beyond the level of the water bath. Again, this solution is unsuitable for direct washing of pieces of large dimensions, just like the previous apparatuses.

Lastly, EP 0 129 518 discloses an apparatus for washing sheets of plastic material that are precut into pieces of large dimensions, for example of the order of 150 cm, consisting of a tank comprising a horizontal drum having a perforated peripheral wall, and a tubular shaft provided with radial blades and with nozzles for supplying jets of water, in which the drum and the inner shaft are controlled at different rotation speeds.

A similar solution, in addition to being extremely bulky and complex, requires extremely long washing time, indicated as about 20-30 minutes, and may entail difficulty in removing polluting substances that have stuck firmly to the plastic material and problems in discharging large plastics pieces which may remain trapped between the blades of the rotating shaft.

OBJECTS OF THE INVENTION

The need therefore exists to find an alternative solution that is constructionally and functionally simpler, which permits good cleaning of the plastics film or sheets precut into pieces of large dimensions, suitably immersed in a washing water bath, with extremely reduced washing times, at the same time enabling the plastics pieces to be discharged more easily at the end of the washing step.

The technical problem that the present invention intends to solve thus consists of providing a solution that is able to overcome the difficulties of washing and extracting and unloading plastics pieces of large dimensions that float in a washing tank, so as to enable controlled washing and discharging of the plastics pieces, according to the degree of contamination thereof, and to prevent plastics pieces from accumulating in the discharging channel, obstructing the passage thereof.

SHORT DESCRIPTION OF THE INVENTION

The problems referred to above and the typical drawbacks of the prior-art apparatuses are remedied by a method and apparatus for washing film and sheets of plastic material, precut into pieces of large dimensions.

In general, the problem has been solved by a method and apparatus for washing plastics film and sheets precut into pieces of large dimensions, subjecting the soiled plastic pieces to intense stirring in a washing tank containing a water bath, removing the clean plastic pieces which float in the water bath, by dragging the clean plastics pieces along a discharging channel by the joint action of a water flow that exits the washing tank and of a dragging device consisting of an endless belt that extends along the discharging channel, supported in a freely tilting manner.

In this manner, the plastic pieces of large dimensions are dragged to the outlet end of the discharging channel, in a floating condition, by the washing water flow and by the dragging belt, preventing the plastic pieces from accumulating at the outlet edge of the discharging channel, locking the dragging belt.

By adjusting the level of the water bath in the washing tank, for example by overflow of the water flow from the discharging channel, or in another manner, by positioning the outlet edge of the discharging channel just below the level of the water bath in the washing tank, replenishing continuously the bath in the washing tank is made possible, minimising water consumption.

Using a variable speed dragging belt, it is possible to control the dwell time of the plastic pieces in the washing tank according to the degree of contamination thereof.

SHORT DESCRIPTION OF THE DRAWINGS

A preferred embodiment of a washing apparatus for plastic film and sheets according to the invention, and the corresponding method, will be disclosed in greater detail below with reference to the example of the attached drawings, in which.

DETAILED DESCRIPTION OF THE INVENTION

Figure 1:
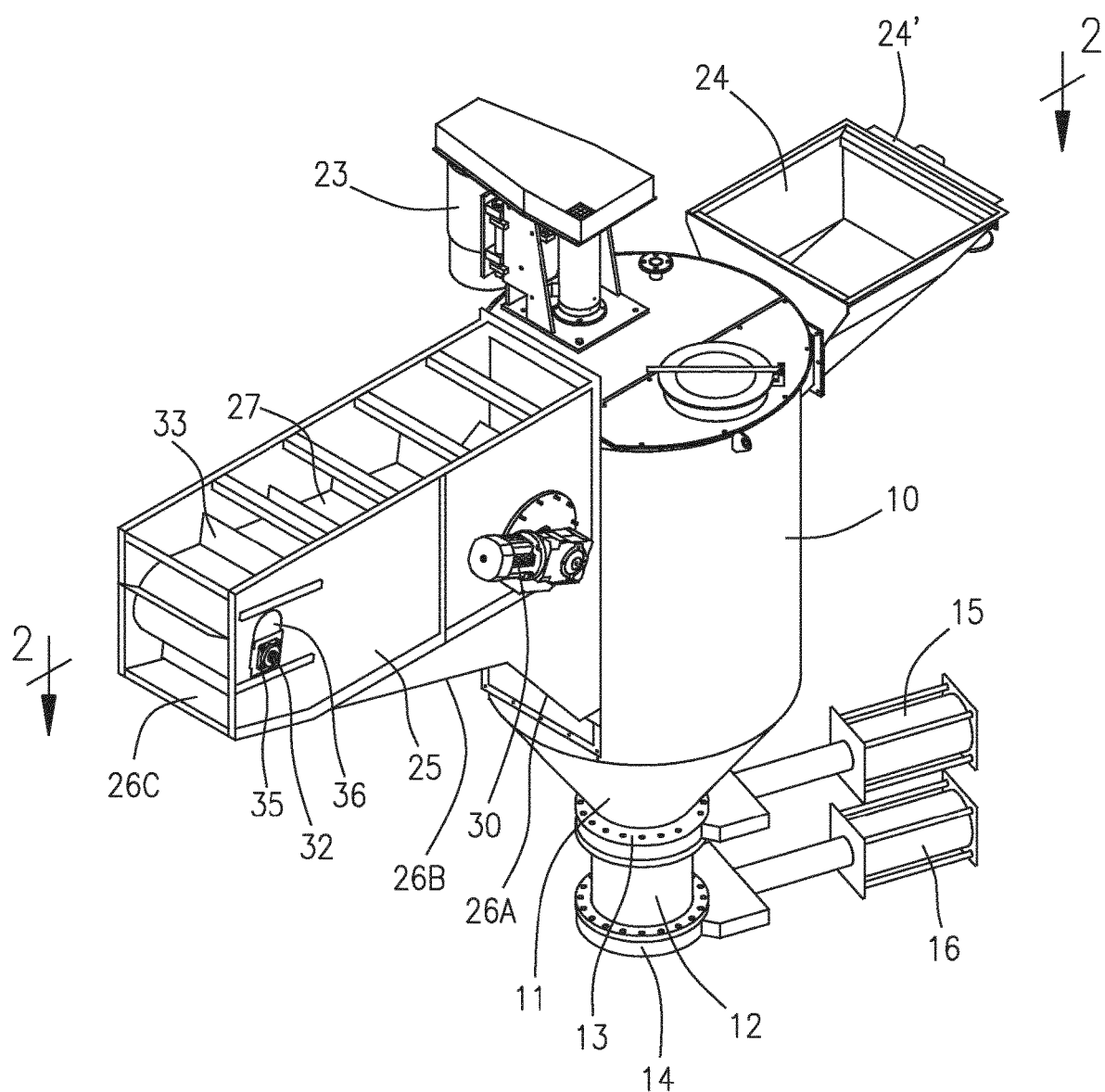
FIG. 1 is a perspective view of the washing apparatus.
Figure 2:
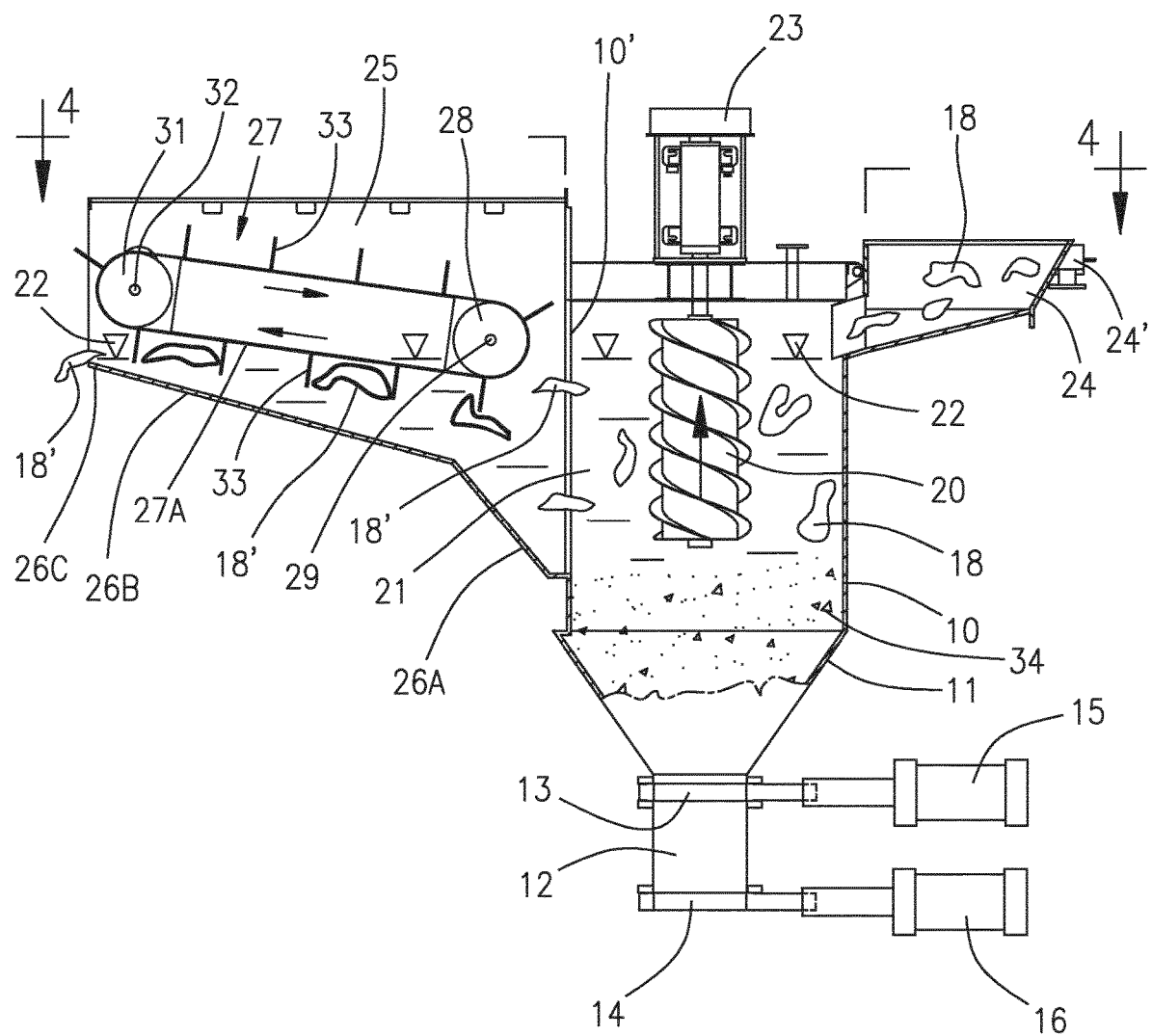
FIG. 2 is a longitudinal section along the line 2-2 of FIG. 1, with the tilting dragging belt in the lowered work position.

As shown in FIGS. 1 and 2, the washing apparatus for film and sheets of plastics material, suitably precut into pieces 18 of large dimensions, having for example a dimension of the order of several decimetres and/or of a metre, for example dimensions between 50 and 150 cm, or more, comprises a washing tank 10 of cylindrical, square or polygonal shape, finishing with a conical bottom 11, or with walls tilting downwards; the bottom 11 of the tank is further provided with a large sediment-discharging pipe 12 for discharging the sediment, which sediment-discharging pipe 12 is normally closed by two valves 13, 14, which are selectively drivable by respective actuators or pneumatic cylinders 15, 16 for discharging polluting material that has separated from the soiled plastic pieces 18 during the washing step, and which has settled on the bottom 11.

Figure 4:
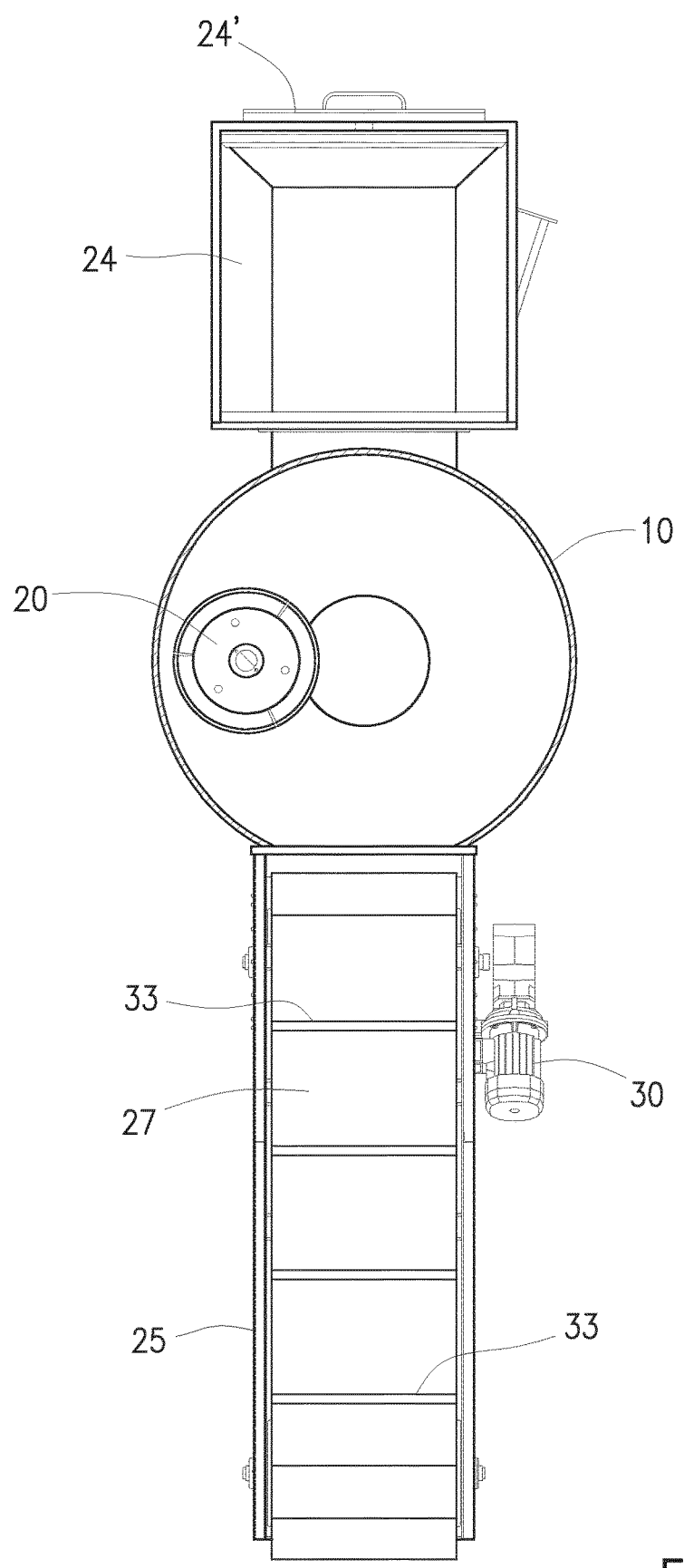
FIG. 4 is a top view of the apparatus, which is partially in a section along the broken line 4-4 of FIG. 2.

The washing tank 10 comprises a screw stirrer 20 positioned eccentrically on a side of the tank 10, leaving in this manner a great stirring and recirculating zone for stirring and recirculating the soiled pieces 18 of plastic material in the washing tank 10, as shown in FIG. 4. The screw stirrer 20 extends vertically downwards, being immersed in a water bath 21 having an upper level 22 of preset height. The screw stirrer 20 can be of the type with one or more continuous screws, with a constant and variable pitch, and it is suitably configured for generating great stirring and preventing soiled plastic pieces 18 from being able to stick to the screw of the stirrer; the screw stirrer 20 is operationally connected to an electric motor 23 configured for driving the screw stirrer 20 at a high number of revolutions, which are suitable for generating intense stirring of the water bath 21 and a continuous upward recirculation, in the same water bath 21, inside the tank 10, of the soiled plastic pieces 18 that the heavy contamination tends to drag downwards, preventing the soiled plastic pieces 18 from floating and being buoyant in the water bath 21.

In the course of experimental tests conducted with a washing apparatus according to the invention, good results were obtained with plastic material 18 precut into pieces of large dimensions, as previously defined, using screw stirrers 20 having an outer diameter of the screw comprised between 500 and 600 mm, commanded to rotate at speeds comprised between 250 and 450 rpm, or higher.

The washing tank 10 is provided with a side hopper 24 for charging the soiled plastic pieces 18; the hopper 24 is provided with a water distributor 24' configured for supplying a washing water flow that is both suitable for dragging the soiled plastic pieces 18 into the washing tank 10, and for continuously replenishing the water bath in the washing tank. The soiled plastic pieces 18 are supplied continuously to the discharging hopper 24 with a washing water flow; nevertheless it is not excluded that in place of the hopper 24 it is possible to use any other device or system for loading the soiled plastic pieces 18 and the washing water flow, other than the one shown.

The washing tank 10, on the side opposite the charging hopper 24, is provided with a discharging channel 25 for discharging the cleaned plastic pieces 18' which float in the washing bath 21. The discharging channel 25 has a rear end in direct communication with a stirring zone of the water bath 21, through a wide side opening 10' of the tank 10, extending longitudinally to a front discharging end 26C for discharging the pieces 18' of plastic material, together with the overflow of a washing water flow originating from the tank 10, substantially corresponding to the washing water flow supplied to the charging hopper 24.

In particular, the discharging channel 25 has a bottom tilting upwards comprising a first greatly tilted bottom wall 26A, forming for example a corner comprised between 30° and 60° with the vertical axis of the tank 10 that is joined to a second bottom wall 26B, having a tilt that is less than that of the first bottom wall 26A, which terminates with a front edge 26C in a position below the level 22 of the water bath 21 in the washing tank 10 and in the discharging channel 25.

According to the present invention, the discharge of the cleaned plastic pieces 18' from the washing tank 10 along channel 25 by dragging is obtained by the combined action of the washing water flow that exits in a controlled manner the discharging channel 25, the flow-rate of which substantially corresponding to the flowrate of the water flow dragging the soiled plastic pieces 18 that enter the charging hopper 24 and the tank 10, and of the action of continuous dragging device substantially consisting of an endless belt 27 that extends longitudinally from a rear end of the channel 25 communicating directly with the stirring zone of the tank 10, to a front end 26C of the discharging channel 25, as shown in FIG. 2.

The dragging endless belt 27 winds around a rear drum 28, the rotation axis 29 of which is operationally connected to an electric control motor 30, shown in FIG. 1, and a front drum 31; the rotation axis 29 of the rear drum 28 and the rotation axis 32 of the front drum 31 are positioned above the level 22 of the water bath 21, with the belt 27 slightly tilted upwards so that at least one rear portion of the lower branch 27A of the dragging belt 27 is partially immersed in the water flow 21 that exits continuously the washing tank 10, through overflow, from the front edge 26C of the channel 25.

In particular, the endless belt 27 dragging the cleaned plastic pieces 18' has a width substantially corresponding to that of the discharging channel 25, and is configured with a plurality of transverse pads 33, which are suitably spaced apart in the longitudinal direction of the belt 27.

The rotation axes 29 and 32 of the two drums 28, 31 of the dragging belt 27 are further positioned, with respect to the bottom wall 26B of the discharging channel 26, such that the dragging pads 33 of the lower branch 27A of the belt 27, protrude into the water flow 21; in this manner the cleaned plastic pieces 18' are advanced from the tank 10 and along the channel 25 by dragging by the endless belt 27 and by the water flow that continuously exits the discharging channel, maintaining the plastic pieces 18' constantly immersed in a buoyant condition.

The washing apparatus further comprises a control device for controlling the motor of the endless belt 27 (which device is not shown) configured for varying the rotation speed of the motor and thus the speed of the endless belt 27, according to different work requirements.

The linear advancement speed of the belt 27 can be maintained constant or can be adjusted through increasing or decreasing during the same washing operating cycle, or during subsequent operating cycles, at a suitable speed, for example comprised between 30 and 40 metres/min; in this manner, by adjusting and/or varying the advancement speed of the endless belt 27 and consequently adjusting and/or varying the outlet flowrate of the cleaned plastic pieces 18', it is possible to control and consequently vary the washing and dwell time of the soiled plastic pieces 18 in the tank 10, increasing and/or decreasing the washing and dwell time according to the greater or lesser degree of contamination of the pieces 18 that are supplied to the hopper 27, and according to the greater or lesser degree of desired cleanness of the pieces 18' that exit the discharging channel 25.

In order to prevent the plastic pieces 18' dragged along the discharging channel 25 being able to get wedged under the pads 33, the tilt of the endless belt 27 is slightly less than the tilt of the bottom wall 26B of the discharging channel, taking care that the pads 33, along the lower branch 27A of the endless belt 27, are at least partially immersed in the bath 21 keeping at a distance that is spaced away from the bottom wall 26B of the discharging channel 25; in this manner, the plastic pieces 18' are always dragged in a buoyant condition.

Figure 3:
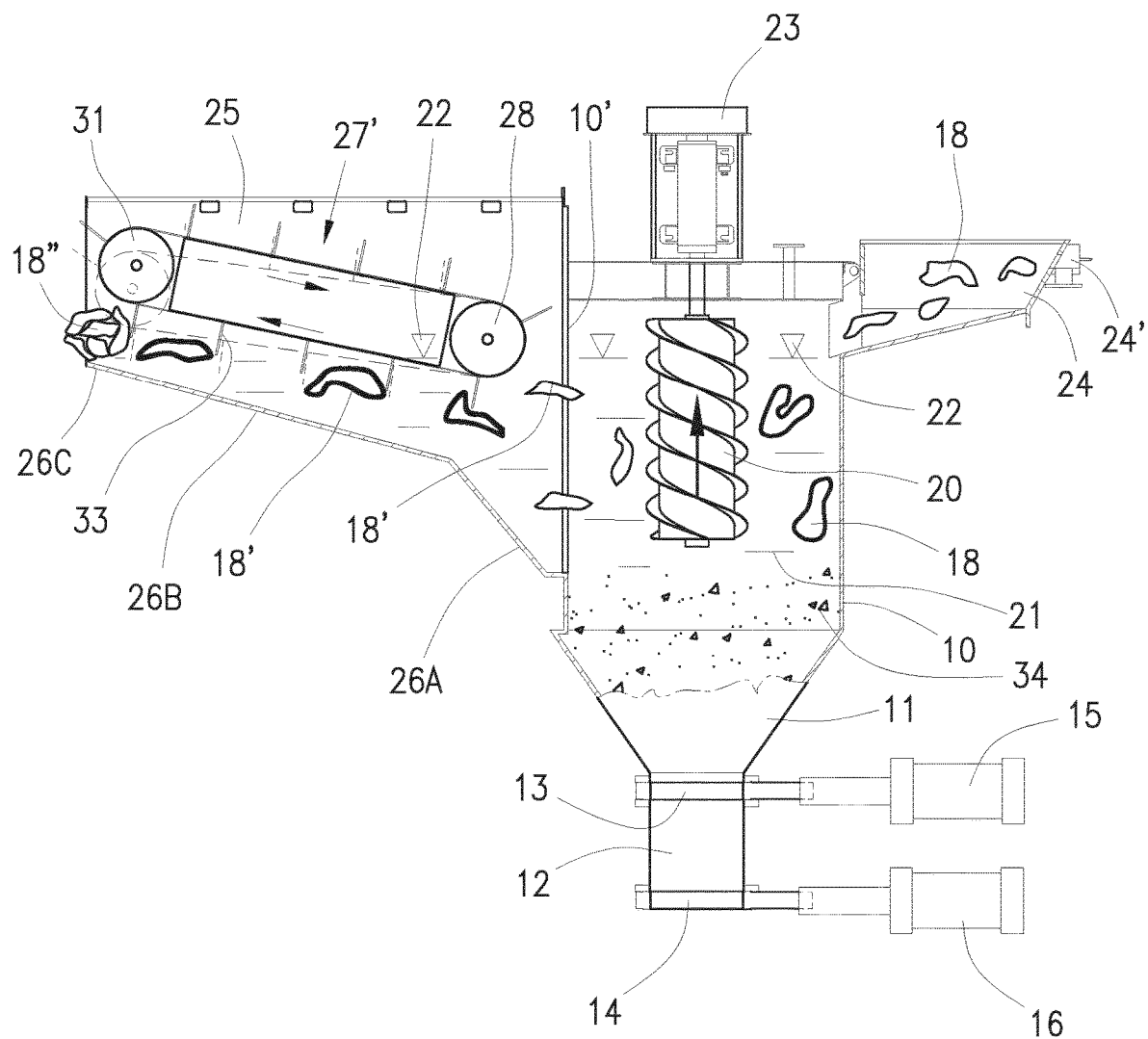
FIG. 3 is a longitudinal section that is similar to that of FIG. 2, showing the tilting dragging belt in a raised position.

Depending on the dimensions and on the features of the soiled plastic pieces 18, and on the constructional and functional features of the entire apparatus, cleaned pieces 18' of plastic material of large dimensions may stop and accumulate at the front edge 26C of the bottom wall of the discharging channel 25 causing, as indicated by 18" in FIG. 3, the locking and the arrest of the endless belt 27.

Another characteristic of the apparatus according to the invention, and of the manner of operation thereof, is that the endless belt 27 is supported by the channel 25, in a manner tilting freely upwards, as shown by 27' in FIG. 3, around the rotation axis 29 of the rear drum 28; accordingly, the rotation axis 32 the front drum 31 has at each end a sliding block 35 that is slidable in a guiding slot 36 near the front edge of the side walk of the channel 25. In this manner, if a hunching 18" of the plastic pieces 18' forms at the front edge 26C of the bottom of the discharging channel 25, the endless belt 27, moved by the control motor 37, lifts up freely, pushing and making the bunch 18" of plastic pieces 18' fall from the front edge of the discharging channel 25. Once the bunch 18" of plastic pieces 18' has been removed, the belt 27 lowers under its own weight again, readopting the operating position of FIG. 2, shown by a dashed line in FIG. 3.

Figure 5:
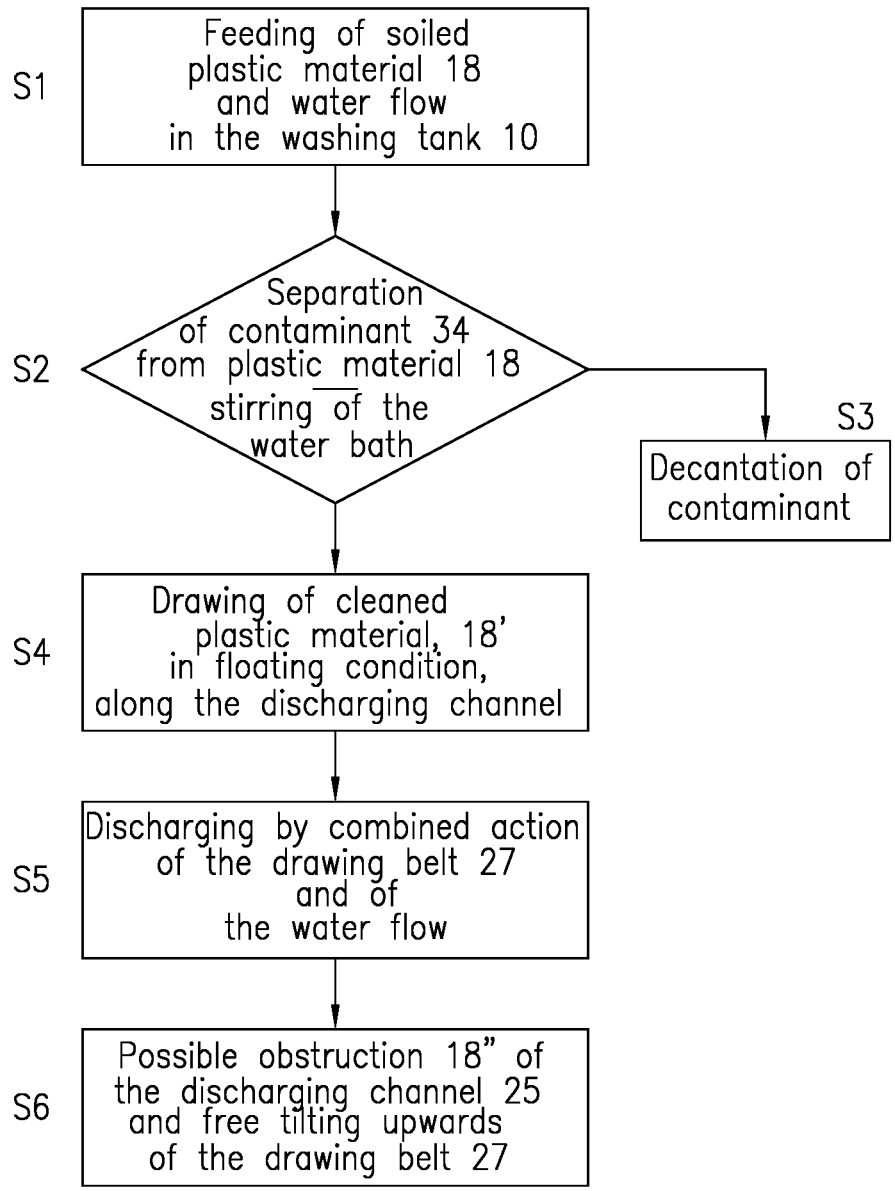
FIG. 5 is a flow chart illustrating the washing method of the apparatus.

The flow chart of FIG. 5 shows schematically the essential steps of the washing method for plastic pieces of large dimensions, during an operating cycle, by the apparatus according to the invention.

During the step S1 the soiled plastic pieces 18 are supplied continuously, together with a washing water flow, to the hopper 24 and consequently to the water bath 21 contained in the tank 10.

During the step S2, through the effect of the strong stirring of the water bath 21, caused by the stirrer 20, the contaminating material 34 which had stuck to the plastic pieces 18, separates, settling through decantation on the conical bottom 11 of the tank 10, during the step S3, from which it can be periodically discharged by opening and closing the valves 13 and 14 in sequence.

The cleaned pieces 18' of plastic material which float in the bath 21 are dragged during the step S4 along the discharging channel 25, being maintained in a floating condition by a combined action of the endless belt 27 and of the water flow that exits the discharging channel 25, as indicated for step S5.

If an obstruction 18" occurs of the discharging channel 25 by the plastic pieces 18', the endless belt 27 can tilt freely upwards, step S6, pushing forwards and making the bunch 18" of plastic pieces fall that obstructs the discharging channel, in this manner automatically restoring the normal operating conditions of the apparatus.

From what has been said and shown with reference to the example of the attached drawings, it is clear that an apparatus and a method is provided for washing sheets of plastic material precut into pieces of large dimensions, which are suitable for achieving the objects of the invention; accordingly other modifications or variations can be made to the entire apparatus or to parts thereof, in particular to the system of charging the plastic pieces and the washing water flow, to the system of stirring the water bath in the washing tank, using a different type of stirrer from the stirrer shown, or configuring otherwise the discharge channel and the continuous dragging devices for dragging the plastic pieces in a floating condition, without thereby falling outside the scope of the claims.

The invention claimed is:

1. A method for washing film and/or sheets of plastic material and for the separation of contaminant substances, comprising the steps of introducing pre-cut soiled pieces of large dimension of the film or sheets of plastic material into a water bath of a washing tank;

supplying a washing water flow for dragging the soiled plastic pieces into the washing, tank and for continuously replenishing the water bath in the washing tank;

adjusting a level of the water bath in the washing tank and positioning the outlet edge of a discharging channel below the level of the water bath in the washing tank so that the water flow continuously exits the washing tank through overflow via a front edge of the discharging channel;

driving a screw stirrer which extends vertically downwardly in the washing tank and is immersed in the water bath for generating intense stirring of the water bath and a continuous upward recirculation of the water bath to separate clean pieces of plastic material from contaminant substances;

drawing the cleaned pieces of plastic material floating on the water bath along the discharging channel with an endless belt having a rear end in direct communication with a stirring zone of the water; and advancing and discharging the cleaned plastic pieces by drawing the cleaned plastic pieces, in a floating condition, along the discharging channel by a combined action of pads extending from the endless belt beneath the level of the water bath along the discharging channel;

overflow of the water flow exiting the washing tank along the discharging channel; and adjusting an advancement speed of the endless belt to vary the outlet flow rate of the cleaned plastic pieces in the tank in accordance with a degree of contamination of the plastic pieces and the desired degree of cleanliness thereof.

2. The method for washing film and/or sheets of plastic material according to claim 1, wherein the soiled plastic pieces are continuously fed into the water bath by a water flow having a flow rate corresponding to the flow rate along the discharging channel, exiting the washing tank.

3. The method for washing film and/or sheets of plastic material according to claim 1, wherein bunching of cleaned pieces in the discharging channel is removed by a thrust and an upwardly tilting movement of the drawing belt.

4. The method for washing film and/or sheets of plastic material according to claim 1, and further comprising the steps of whirling the water bath and recirculating the soiled plastic pieces in the washing tank by driving the screw stirrer which is positioned on a side of the washing tank at a high number of revolutions for generating intense stirring of the water bath and the continuous upward recirculation of the water bath.

5. The method for washing film and/or sheets of plastic material according to claim 1, and further comprising the step of adjusting the time that the soiled plastic pieces remain in the water bath of the washing tank by, changing the quantity of the cleaned plastic pieces drawn outside from the washing tank along the discharging channel.

6. An apparatus suitable for washing large pre-cut pieces of soiled film and/or sheets of plastic material and for separation of contaminant substances, comprising:

a washing tank containing a water bath having a prefixed level;

a stirrer arranged in the water bath in spaced relation to a bottom of the washing tank and arranged for generating intense stirring of the water bath and a continuous upward recirculation to separate clean nieces of plastic from contaminant substances;

a discharging channel for cleaned pieces of plastic material and having rear end in direct communication with a stirring zone of the water bath and a bottom wall extending upwardly from the washing tank; and an endless conveyor belt configured for drawing the cleaned plastic pieces floating on the water bath from the washing tank along the discharging channel, said endless conveyor belt extending along the discharging channel and having a lower branch provided with pads for drawing the cleaned plastic pieces, said pads extending from said endless conveyor belt beneath the level of the water bath along the discharging channel;

wherein the stirrer includes a screw stirrer which extends vertically in the water bath and wherein said endless conveyor belt is freely tiltably supported, said discharging channel and endless conveyor belt being configured to advance and discharge the cleaned plastic pieces by drawing the cleaned plastic pieces in a floating condition along the discharging channel by a combined action of the endless conveyor belt and by overflow of the water flow exiting the washing tank along the discharging channel and from a font edge thereof.

7. The apparatus according to claim 6, wherein said discharging channel comprises a first sloping bottom wall that extends from an opening of the washing tank, and a second sloping bottom wall having a slant angle less than a slant angle of said first bottom wall of said discharging channel.

8. The apparatus according to claim 6, wherein the washing tank comprises a hopper for charging the soiled plastic pieces, and a device for feeding and distributing a water flow.

9. The apparatus according to claim 6, wherein said washing tank comprises a conical bottom for sedimentation of contaminant substances, and a plurality of discharging valves selectively actuatable between an opened and a closed condition.

10. The apparatus according to claim 6, and further comprising a device to change the speed of the endless conveyor belt for drawing the cleaned plastic pieces along the discharging channel.

11. The apparatus according to claim 6, wherein said endless conveyor belt is supported by a fore drum and a rear drum each having a rotation axis, in which the endless conveyor belt is tiltably supported around the rotational axis of the rear drum.

12. The apparatus according to claim 11, wherein the fore rotating drum of the conveyor belt comprises a rotational axis provided with sliding blocks movable in respective guiding slots in the discharging channel.

* * * * *